(12) United States Patent
Killick (10) Patent No.: US 9,313,536 B1
(45) Date of Patent: Apr. 12, 2016

(54) SYSTEMS AND METHODS FOR DYNAMIC INSERTION

(71) Applicant: COX COMMUNICATIONS, INC., Atlanta, GA (US)

(72) Inventor: Raynald H. Killick, Atlanta, GA (US)

(73) Assignee: Cox Communications, Inc., Atlanta, GA (US)

(*) Notice: Subject to any disclaimer, the term of this patent is extended or adjusted under 35 U.S.C. 154(b) by 0 days.

(21) Appl. No.: 14/593,533

(22) Filed: Jan. 9, 2015

(51) Int. Cl.
*H04N 7/16* (2011.01)
*H04N 21/262* (2011.01)
*H04N 21/81* (2011.01)
*H04N 21/488* (2011.01)

(52) U.S. Cl.
CPC ... *H04N 21/26258* (2013.01); *H04N 21/26275* (2013.01); *H04N 21/4882* (2013.01); *H04N 21/812* (2013.01); *H04N 21/814* (2013.01)

(58) Field of Classification Search
CPC .......... H04N 21/26258; H04N 21/812; H04N 21/4331; H04N 21/814; H04N 21/4532; H04N 21/25883; H04N 21/44543; H04N 21/4622; G08B 27/008
See application file for complete search history.

(56) References Cited

U.S. PATENT DOCUMENTS

| | | | |
|---|---|---|---|
| 8,060,904 B1* | 11/2011 | Evans et al. ...................... 725/35 |
| 2009/0259941 A1* | 10/2009 | Kennedy, Jr. ................. 715/719 |
| 2011/0093885 A1* | 4/2011 | Ravula ............................ 725/32 |
| 2011/0116376 A1* | 5/2011 | Pacella et al. ................. 370/235 |
| 2011/0264530 A1* | 10/2011 | Santangelo et al. ....... 705/14.64 |
| 2014/0033250 A1* | 1/2014 | Kennedy ........................ 725/32 |
| 2014/0278920 A1* | 9/2014 | Holden ...................... 705/14.44 |

* cited by examiner

*Primary Examiner* — Oleg Asanbayev
(74) *Attorney, Agent, or Firm* — Sutherland Asbill & Brennan LLP (57) ABSTRACT

This disclosure describes systems, methods, and computer-readable media related to a dynamic advertising insertion infrastructure. A stream setup message associated with a stream content request may be received. Setup information associated with the stream content request may be identified. A non-entertainment playlist selected based on, at least in part, the setup information may be received. The stream setup message may be modified, wherein the modified stream setup message comprises at least one or more references to the non-entertainment content. The modified stream setup message may be routed to a streamer system. A first response message may be received by the router from the streamer system based at least in part on the second stream setup message. A second response message that comprises at least one or more references to the second content may be received by the router. The second response message may be routed by the router to a back office.

16 Claims, 5 Drawing Sheets

SYSTEMS AND METHODS FOR DYNAMIC INSERTION

BACKGROUND

Media content streaming, such as streaming of entertainment content, is a form of communication service that allows users to receive such content over communication networks. For example, users may use media streaming to enjoy their favorite movies, television or radio shows, videos, or other programming content. A cable television system delivers television programming to users using radio frequency (RF) signals, where a video on demand (VOD) back office (VBO) may be responsible for the management of secondary content (e.g., advertisement) that may be combined with the content requested by users.

BRIEF DESCRIPTION OF THE FIGURES

Reference will now be made to the accompanying drawings, which are not necessarily drawn to scale, and wherein.

Embodiments of the disclosure are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

DETAILED DESCRIPTION OF EMBODIMENTS OF THE DISCLOSURE

Embodiments of the disclosure may include systems and methods for dynamic insertion in a media content distribution network. For example, if a user is watching media content, such as a television program that is being streamed to a user device, at different points of the program non-entertainment content may be inserted during the streaming session of the television program. Some examples of non-entertainment content may be advertisements ("ads"), billing reminders, emergency announcements, etc. Examples of media content may be a television show, a pay-per-view movie entertainment content (e.g., television show, movie, etc.), instructional content, educational content or other types of media. Media providers, such as television cable companies, may select non-entertainment content, such as one or more ads, based at least in part on an advertisement campaign(s) and may be relevant to a user. The one or more ads may also be selected based at least in part on one or more of a user profile, a time of day, and a streaming session parameters (e.g., television, radio channel, etc.).

In an illustrative embodiment of the disclosure, a content provider system (e.g., a cable television system) may include over-the-air transmitter of media content signals. In these cases, the media content may be delivered over a particular geographic region carried by any variety of RF signals, such as ultra-high frequency (UHF), very-high frequency (VHF), or any other suitable frequency bands. For example, a content provider system may include one or more servers enabling various functionalities of the content provider system including. Some examples of these servers may include a VBO and a VOD streamer. These servers may exchange messages with a user device (e.g., a set-top box, home router, computer, tablet, etc.) to allow the user to request media content, for example, a television show or movie, and then receive a playlist that may be associated with the media content in a streaming session.

In accordance with an embodiment of the disclosure, the content provider system may include an insertion router that is in communication with, but independent of the VBO and the VOD streamer. The insertion router may receive a playlist associated with the requested media content, retrieve one or more non-entertainment playlists, and then dynamically insert the non-entertainment playlist into the media content playlist, which may result in a combined playlist that may be sent to the VOD streamer for establishing the streaming session in order to present to the user device.

In accordance with embodiments of the disclosure the insertion router may intercept a stream setup message associated with a streaming session (e.g., playing a television show or movie). The insertion router may extract from the stream setup message, among other things, identifying information related to the source, destination, and/or the streaming session. The insertion router may retrieve, from a services server, a second content playlist(s) (e.g., one or more ad playlist(s)) based at least in part on information extracted from the stream setup message. Independently from the VBO and the VOD streamer, the insertion router may combine the media content playlist(s) and the second content playlist(s). For example, the insertion router may create an updated or new stream setup message that conflates the media content playlist(s) and the second content playlist(s) together for delivery to the user device. This may enable a radio frequency ("RF") video-on-demand infrastructure to be augmented with a content insertion solution without incurring changes to the VBO and/or the VOD streamer.

Illustrative Use Cases and System Architecture

Figure 1:
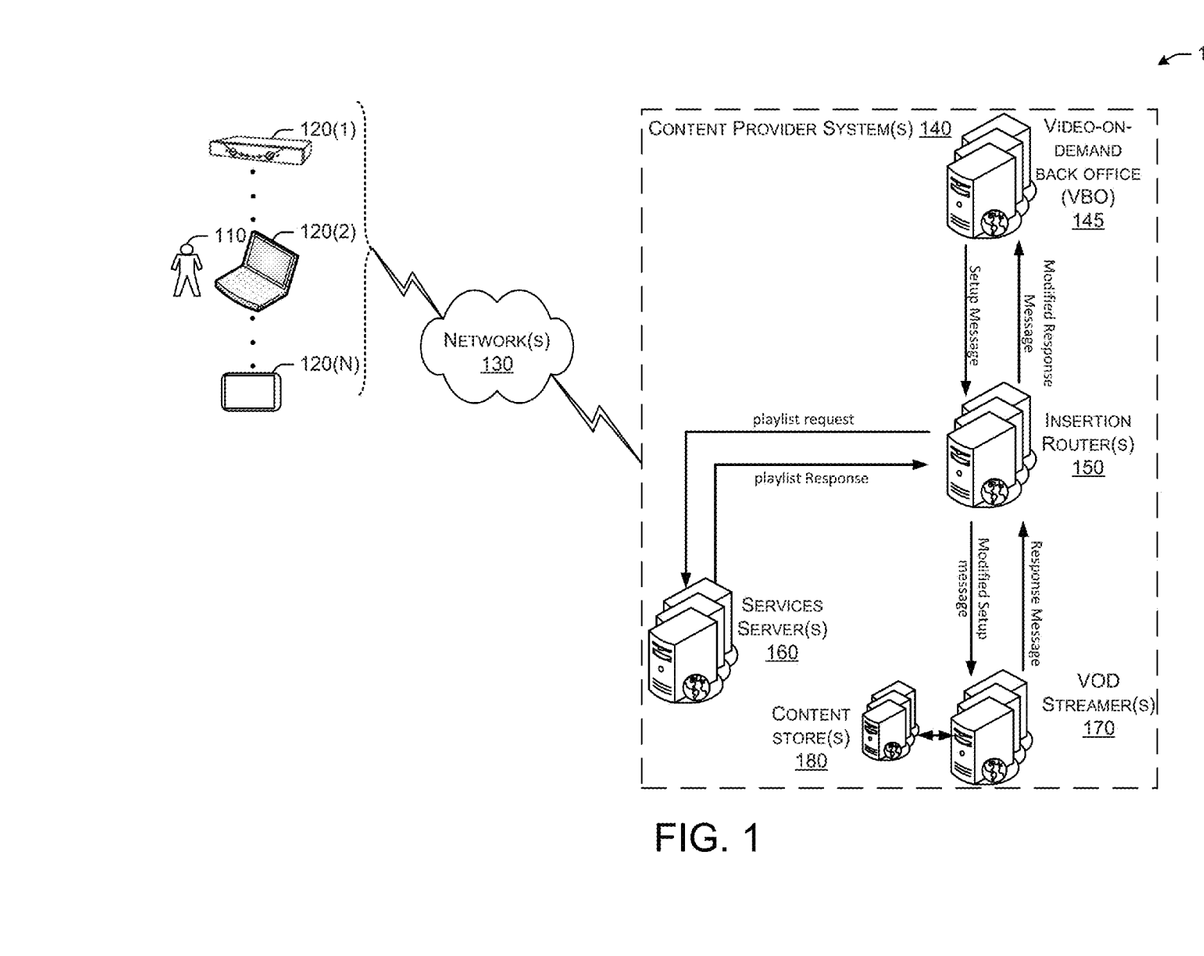
FIG. 1 is a schematic diagram illustrating an example dynamic insertion architecture that may be operated, accordance with embodiments of the disclosure.

FIG. 1 depicts an example of a dynamic insertion environment 100 where non-entrainment content may be inserted into a media content (e.g., a movie, television show, video, etc.) in accordance with embodiments of the disclosure.

The dynamic insertion environment 100 may include one or more user devices 120(1)-(N), collectively or individually referred to hereinafter as user device 120, associated with the user 110. The user devices 120 may communicate with the content provider system(s) 140 via one or more networks 130. The content provider system(s) 140 may include, for example, VBO 145, insertion router(s) 150, services server(s) 160, VOD streamer(s) 170, and one or more content store(s) 180.

In an embodiment, the VBO 145 may be a server that is responsible for media session management. The VBO 145 may authenticate the user device 120 (e.g., a set-top box) requesting a media content (e.g., a movie). If the authentication is successful, then the VBO 145 may allow the user device 120 to process the requested content during a streaming session, as discussed in greater detail below. In an embodiment, the insertion router 150 may be located between and in communication with both the VBO 145 and the VOD streamer(s) 170. Accordingly, messages between the VBO 145 and the VOD streamer(s) 170 may be intercepted by or pass through the insertion router 150. For example, when a user device 120 requests a media content (e.g., a movie), a VBO would typically communicate with the VOD streamer to set up a streaming session. For example, the VBO 145 may send a stream setup message to the VOD streamer(s) 170 that may respond by initiating the setup of the streaming session. However, in order to provide dynamic insertion into the media content requested by the user device, an embodiment of the present disclosure provides the insertion router 150, which may intercept the stream setup message intended for the VOD streamer(s) 170, create a modified stream setup message that may include a combined playlist comprising a media content playlist and a non-entertainment playlist(s). The insertion router 150 may intercept the stream setup message without the VBO 145 or the VOD streamer(s) 170 knowledge. The insertion router 150 may then send the modified stream setup message to its intended destination, that is, the VOD streamer(s) 170. In response to receiving the modified stream setup message the VOD streamer(s) 170 may send a response message to the VBO 145, which may pass through the insertion router 150 without modification. In this exchange, the VBO 145 and VOD streamer(s) 170 require no modification, and may operate as though the insertion router 150 is not present. Alternatively, the insertion router 150 may intercept the response message to the VBO 145 and may modify the response message to include the non-entertainment playlist(s), which in turn may be sent to the user device for processing. In this manner, the modified response message contains references to the media content (e.g., a movie) and non-entertainment content (e.g., ads).

In an embodiment, once the insertion router 150 has intercepted the stream setup message, the insertion router 150 may identify session objects in the stream setup message, which may include, among other things, a video-on-demand asset provider ID (PID), a provider asset ID (PAID), and an STB ID (e.g., media access control ("MAC") address) originating the request. An example of a PID may be "NBC.com," an example of PAID may be an asset ID following the CableLabs ADI specification. It is understood the above are only examples of session objects and that other session objects may be used. Based at least in part on one or more of the session objects from the stream setup message, the insertion router 150 may generate and send an ad playlist(s) request to the services server 160. In response to the request, the insertion router 150 may receive one or more non-entertainment playlists, such as ad playlists. In addition to ads, the non-entertainment content inserted in to the streaming session may include billing reminders, emergency announcements or any other non-entertainment content. The one or more ad playlists may include references to ads to be presented to the user device 120 during the streaming session of the requested content. The references included in the playlist may be considered as items in a list. One example of representing a playlist item is to use a media streaming protocol such as Session Description Protocol (SDP).

The VOD streamer(s) 170 may facilitate the streaming of media content on a user device 120. For example, the VOD streamer(s) 170 may be configured to communicate with the user device 120 and coordinate the delivery of media content to the user device 120. The VOD streamer(s) 170 may be configured, in example embodiments, to receive a request for media content, either directly or indirectly, from the user device 120. Based on the request, the VOD streamer(s) 170 may determine if the requested media content is to be provided to the user device 120 from which the request originated. The VOD streamer(s) 170 may communicate with the VBO 145 in order to set up a streaming session for the media content (e.g., a movie) playback on the user device 120. The VOD streamer(s) 170 may access streaming data files from the media content store 180. Accordingly, the dynamic insertion may be accomplished without modification of VBO 145 or VOD streamer(s) 170 via use of the insertion router 150 to modify the setup message and/or the response to the setup message.

Figure 2:
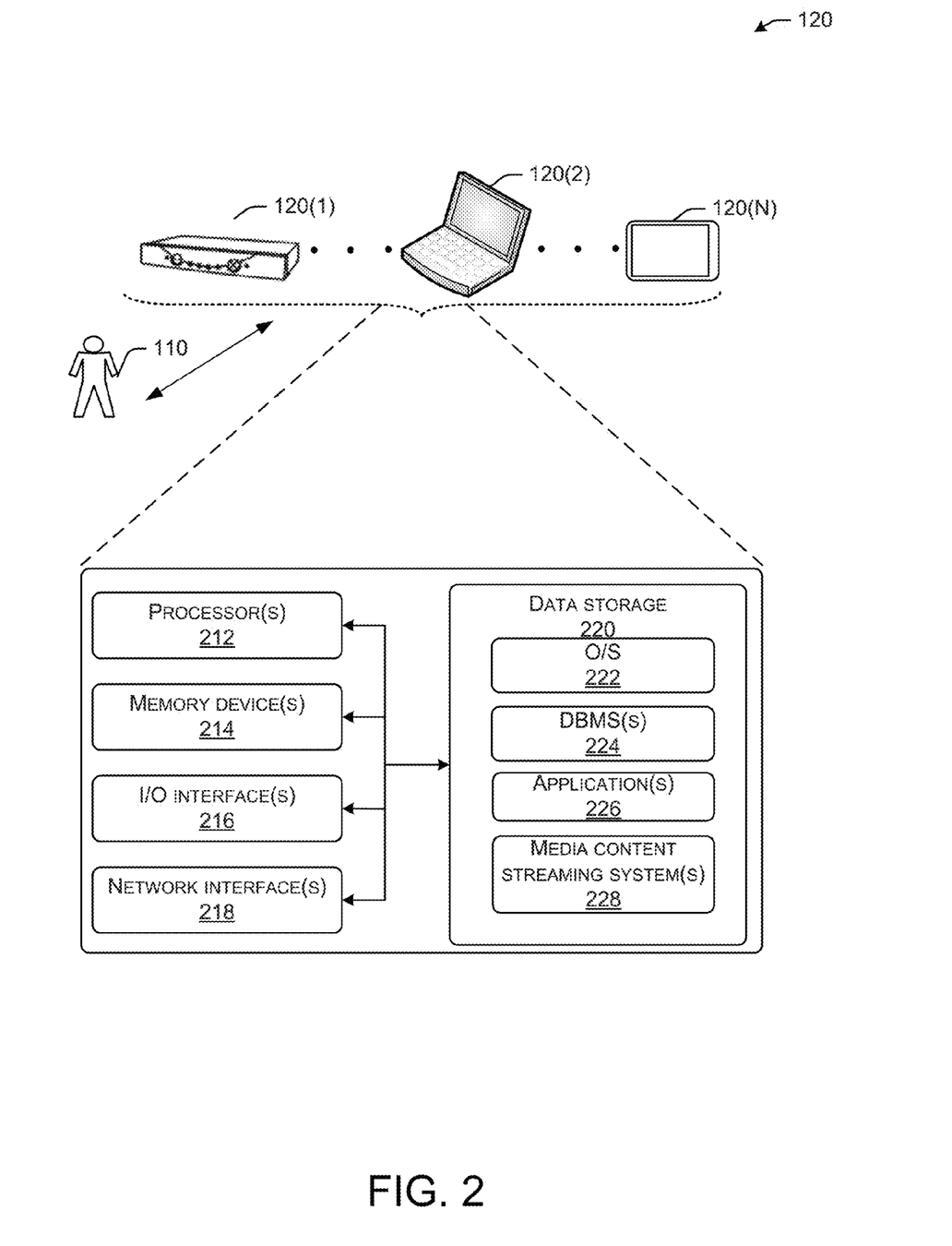
FIG. 2 is a block diagram illustrating a user device of the dynamic insertion architecture of FIG. 1, in accordance with embodiments of the disclosure.

FIG. 2 depicts an illustrative diagram of a user device 120 configuration, in accordance with one or more embodiments of the disclosure. Some user devices 120 may be managed devices, such as cable set top boxes (STB), televisions with integrated STBs, or satellite signal receiver. Managed devices may have one or more functionality that may be controlled by the content provider systems 140, such as a cable service provider. A managed device may communicate directly to the content provider system 140, and elements associated therewith. Content may be provided to the managed devices via a variety of formats and/or channels, such as quadrature amplitude modulated (QAM) signals carried over any variety and/or combination of communication links, such as coaxial cables, fiber optic cables, and/or hybrid fiber and coaxial (HFC) cables. The managed user devices may be configured to receive television signals (digital or analog) through a home gateway or directly from the content provider system 140. Others of the user devices 120 may be unmanaged user devices. These unmanaged user devices may be linked to the one or more networks 130 and may not be controlled by any particular provider of content. For example, the unmanaged user devices 120 may have little or no functionality that may be controlled by the content provider system 140. The unmanaged user devices 120 may include, but are not limited to, desktop computers, laptop computers, netbook computers, personal digital assistants (PDA), tablet computing devices, smartphones, Web enabled televisions, digital video recorder (DVR) device, or combinations thereof. The unmanaged devices 120 may receive content in a variety of mechanisms, including, for example, streaming media over the Internet. In some cases, the content provider system 140 may provide access to the Internet to the unmanaged user devices 120 via a variety of suitable mechanisms, such as the data over cable service interface specification (DOCSIS). In one aspect, the content may be provided to the user device 120 in a series of content portions. Therefore, the user device 120 may provide the media content that is desired by the user 110 of the user device 120 by sequentially rendering the portions of the content on an audio/visual output interface of the user device 120. For example, the user device 120 may request media content from the content provider system 140. The request for the media content may include identification information of the user device 120, identification information of the user 110, identification information of the content provider, and/or identifying information about the content.

Each of the user device(s) 120 may include one or more processors (processor(s)) 212, one or more memory devices 214 (generically referred to herein as memory 214), one or more input/output ("I/O") interface(s) 216, one or more network interface(s) 218, and data storage 220. These various components will be described in more detail hereinafter.

The processor(s) 212 may include any suitable processing unit capable of accepting digital data as input, processing the input data based on stored computer-executable instructions, and generating output data. The computer-executable instructions may be stored, for example, in the data storage 220 and may include, among other things, operating system software and application software. The computer-executable instructions may be retrieved from the data storage 220 and loaded into the memory 214 as needed for execution. The processor(s) 212 may be configured to execute the computer-executable instructions to cause various operations to be performed. The processor(s) 212 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 220 may store program instructions that are loadable and executable by the processor(s) 212, as well as data manipulated and generated by the processor(s) 212 during execution of the program instructions. The program instructions may be loaded into the memory 214 as needed for execution. Depending on the configuration and implementation of the user device(s) 120, the memory 214 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 214 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The user device(s) 120 may further include additional data storage 220 such as removable storage and/or non-removable storage including, but not limited to, magnetic storage, optical disk storage, and/or tape storage. Data storage 220 may provide non-volatile storage of computer-executable instructions and other data. The memory 214 and/or the data storage 220, removable and/or non-removable, are examples of computer-readable storage media (CRSM).

The user device(s) 120 may further include network interface(s) 218 that facilitate communication between the user device(s) 120 and other devices of the illustrative dynamic insertion environment 100 or application software via the network(s) 130.

The user device(s) 120 may additionally include one or more input/output (I/O) interfaces 216 (and optionally associated software components such as device drivers) that may support interaction between a user 110 and a variety of I/O devices, such as a keyboard, a mouse, a pen, a pointing device, a voice input device, a touch input device, a display, speakers, a camera, a microphone, a printer, and so forth.

Referring again to the data storage 220, various program modules, applications, or the like may be stored therein that may comprise computer-executable instructions that when executed by the processor(s) 212 cause various operations to be performed. The memory 214 may have loaded from the data storage 220 one or more operating systems (O/S) 222 that may provide an interface between other application software (e.g., dedicated applications, a browser application, a web-based application, a distributed client-server application, etc.) executing on the user device 120 and the hardware resources of the user device 120. More specifically, the O/S 222 may include a set of computer-executable instructions for managing the hardware resources of the user device(s) 120 and for providing common services to other application programs (e.g., managing memory allocation among various application programs). The O/S 222 may include any operating system now known or which may be developed in the future including, but not limited to, any mobile operating system, desktop or laptop operating system, mainframe operating system, or any other proprietary or open-source operating system.

The data storage 220 may further include one or more database management systems (DBMS) 224 for accessing, retrieving, storing, and/or manipulating data stored in one or more datastores. The DBMS 224 may use any of a variety of database models (e.g., relational model, object model, etc.) and may support any of a variety of query languages.

The data storage 220 may additionally include various other program modules that may include computer-executable instructions for supporting a variety of associated functionality. For example, the data storage 220 may include one or more application(s) 226. Further, the data storage 220 may include a media content streaming module(s) 228.

The application(s) 226 may include computer-executable instructions that in response to execution by the processor(s) 212 cause operations to be performed including executing of different functionality specific to the application(s) 226. In some embodiments, the application(s) 226, in response to receiving the notification, may initiate data synchronization with one or more remote servers, access the Internet, request media content, display media content display email, or the like. It is understood that the above are only examples and other applications may be available on any of the user device(s) 120.

The media content streaming module(s) 228 may be loaded into the memory 220. The media content streaming module(s) 228 may request media content from the content provider system(s) 140. The request for the media content may include identification information of the user device 120, identification information of the user 110, identification information of the content provider, and/or identifying information of the content.

The media content streaming module(s) 228 may receive data representing a media content (e.g., a movie) via a predetermined protocol, and may reconstruct the media content for playback. The media content streaming module(s) 228 may receive streaming content at the user device 120, including a first content and a second content. The first content may be a media content (e.g., entertainment content, instructional content, educational content, etc.). Examples of entertainment content may include video, audio, textual, or other content. The second content may be a non-entertainment content, such as ads, billing reminders, emergency announcements, or other content. For example, the user 110 may request a video for viewing on the user device 120. The media content streaming module(s) 228 may receive a playlist that may include indexes to the first and the second content. A playlist, as used herein, is understood to reference/index the various portions of the first and second content. For example, a movie may include multiple video portions that may be individually transmitted to the user device 120. The media content streaming module(s) 228 may use the combined playlist to stream the first content and the second content.

Figure 3:
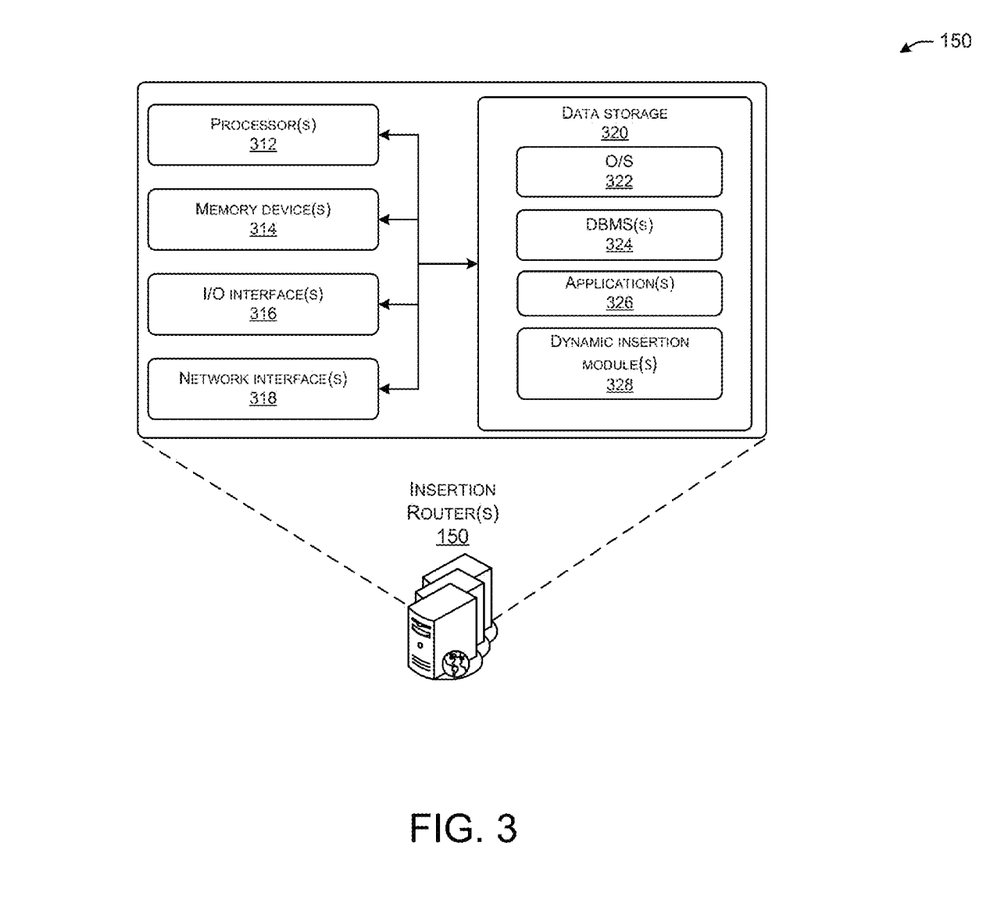
FIG. 3 is a block diagram illustrating an advertisement router of the dynamic insertion architecture of FIG. 1, in accordance with embodiments of the disclosure.

FIG. 3 depicts an illustrative diagram configuration, including various hardware and software components of at least one insertion router(s) 150, in accordance with one or more embodiments of the disclosure.

Each of the insertion router(s) 150 may include processor(s) 312, memory device(s) 314 (generically referred to herein as memory 314), input/output ("I/O") interface(s) 316, and network interface(s) 318, and data storage 320. These various components will be described in more detail hereinafter.

The processor(s) 312 may include any suitable processing unit capable of accepting digital data as input, processing the input data based on stored computer-executable instructions, and generating output data. The computer-executable instructions may be stored, for example, in the data storage 320 and may include, among other things, operating system software and application software. The computer-executable instructions may be retrieved from the data storage 320 and loaded into the memory 314 as needed for execution. The processor(s) 312 may be configured to execute the computer-executable instructions to cause various operations to be performed. The processor(s) 312 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 320 may store program instructions that are loadable and executable by the processor(s) 312, as well as data manipulated and generated by the processor(s) 312 during execution of the program instructions. The program instructions may be loaded into the memory 314 as needed for execution. Depending on the configuration and implementation of the insertion router(s) 150, the memory 314 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 314 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The insertion router(s) 150 may further include additional data storage 320 such as removable storage and/or non-removable storage including, but not limited to, magnetic storage, optical disk storage, and/or tape storage. Data storage 320 may provide non-volatile storage of computer-executable instructions and other data. The memory 314 and/or the data storage 320, removable and/or non-removable, are examples of computer-readable storage media (CRSM).

The insertion router(s) 150 may further include network interface(s) 318 that facilitate communication between the insertion router(s) 150 and other devices of the illustrative dynamic insertion environment 100 or application software via the network(s) 130.

The insertion router(s) 150 may additionally include one or more input/output (I/O) interfaces 316 (and optionally associated software components such as device drivers) that may support interaction between a user 110 and a variety of I/O devices, such as a keyboard, a mouse, a pen, a pointing device, a voice input device, a touch input device, a display, speakers, a camera, a microphone, a printer, and so forth.

Referring again to the data storage 320, various program modules, applications, or the like may be stored therein that may comprise computer-executable instructions that when executed by the processor(s) 312 cause various operations to be performed. The memory 314 may have loaded from the data storage 320 one or more operating systems (O/S) 322 that may provide an interface between other application software (e.g., dedicated applications, a browser application, a web-based application, a distributed client-server application, etc.) executing on the user device 120 and the hardware resources of the user device 120. More specifically, the O/S 322 may include a set of computer-executable instructions for managing the hardware resources of the insertion router(s) 150 and for providing common services to other application programs (e.g., managing memory allocation among various application programs). The O/S 322 may include any operating system now known or which may be developed in the future including, but not limited to, any mobile operating system, desktop or laptop operating system, mainframe operating system, or any other proprietary or open-source operating system.

The data storage 320 may further include one or more database management systems (DBMS) 324 for accessing, retrieving, storing, and/or manipulating data stored in one or more datastores. The DBMS 324 may use any of a variety of database models (e.g., relational model, object model, etc.) and may support any of a variety of query languages.

The data storage 320 may additionally include various other program modules that may include computer-executable instructions for supporting a variety of associated functionality. For example, the data storage 320 may include one or more application(s) 326. Further, the data storage 320 may include a media content streaming module(s) 328.

The application(s) 326 may include computer-executable instructions that in response to execution by the processor(s) 312 cause operations to be performed including executing of different functionality specific to the application(s) 326. In some embodiments, the application(s) 326, in response to receiving the notification, may initiate data synchronization with one or more remote servers, access the Internet, request media content, display media content display email, or the like. It is understood that the above are only examples and other applications may be available on any of the insertion router(s) 150.

The data storage 320 may contain one or more dynamic insertion module(s) 328. The dynamic insertion module(s) 328 may enable insertion of a second playlist into a first content playlist (e.g., one or more ads into a movie). For example, and as explained above, the insertion router 150 may receive a stream setup message that may include a first playlist for a requested media content and one or more session objects. In some embodiments, the insertion router 150 may intercept the stream setup message. The insertion router 150 may determine the second playlist that may be used to update/modify the stream setup message based on at least in part the one or more session objects included in the stream setup message. The second playlist may be a playlist that may contain items such as indexes to non-entertainment content, such as, ads, bill reminders, emergency announcements, etc.

The dynamic insertion module(s) 328 may update/modify the stream setup message to include the second playlist (e.g., non-entertainment content such as ads"). The selection of the second playlist may be based on information retrieved from the stream setup message, such as the session objects including a video-on-demand asset provider ID, a provider asset ID, and a set-top ID originating the request. It is understood that the above are only examples of session objects and that other session objects may be utilized.

In one embodiment, the insertion router 150 may request the second playlist. The request may be based on one or more of the session objects. For example, the request may include the length of ads and number of ads to be inserted, that may be used by the content service server 160 to determine the second playlist. In response to the request for the second playlist, the dynamic insertion module(s) 328 may receive the second playlist from the services server 160. The dynamic insertion module(s) 328 may modify the stream setup message to incorporate the second playlist received from the services server 160 into the stream setup message. The dynamic insertion module(s) 328 may determine where to insert the items from the second playlist within the original stream setup message. This may be based on known or predetermined locations, for example by following a Session Description Protocol (SDP). The one or more locations may depend on the type of the media content (e.g., a movie), a time of day, a user profile, a user subscription, the length of media content.

The dynamic insertion module(s) 328 may route the updated stream setup message to its intended destination, such as the VOD streamer(s) 170. For example, once the user device 120 requests the playback of a movie, the dynamic insertion module(s) 326 may receive/intercept the stream setup message from the VBO 145 and may modify the stream setup message by inserting one or more second playlist into the stream setup message. The dynamic insertion module(s) 326 may then route the modified stream setup message to its intended destination, such as the VOD streamer(s) 170. The VOD streamer 170 may respond to the modified stream setup message by generating a response message. The response message may be generated by the VOD streamer 170 to incorporate the second playlist into the first playlist (e.g., media content playlist). Alternatively, the response message may be generated by the VOD streamer 170 that may not include the second playlist. In other words, the response message may be generated by the VOD streamer 170 without consideration of whether there is a second playlist that may need to be inserted into a first playlist before presenting to the user device 120. In this scenario, the response message may be intercepted by the insertion router 150 in order to modify the response message to include one or more items of the second playlist. In other words, the modified response message may be updated with items from the second playlist in order to present to the user device 120. The modified response message may include items from the first playlist (e.g., media content playlist) and items from the second playlist (e.g., ads).

Figure 4:
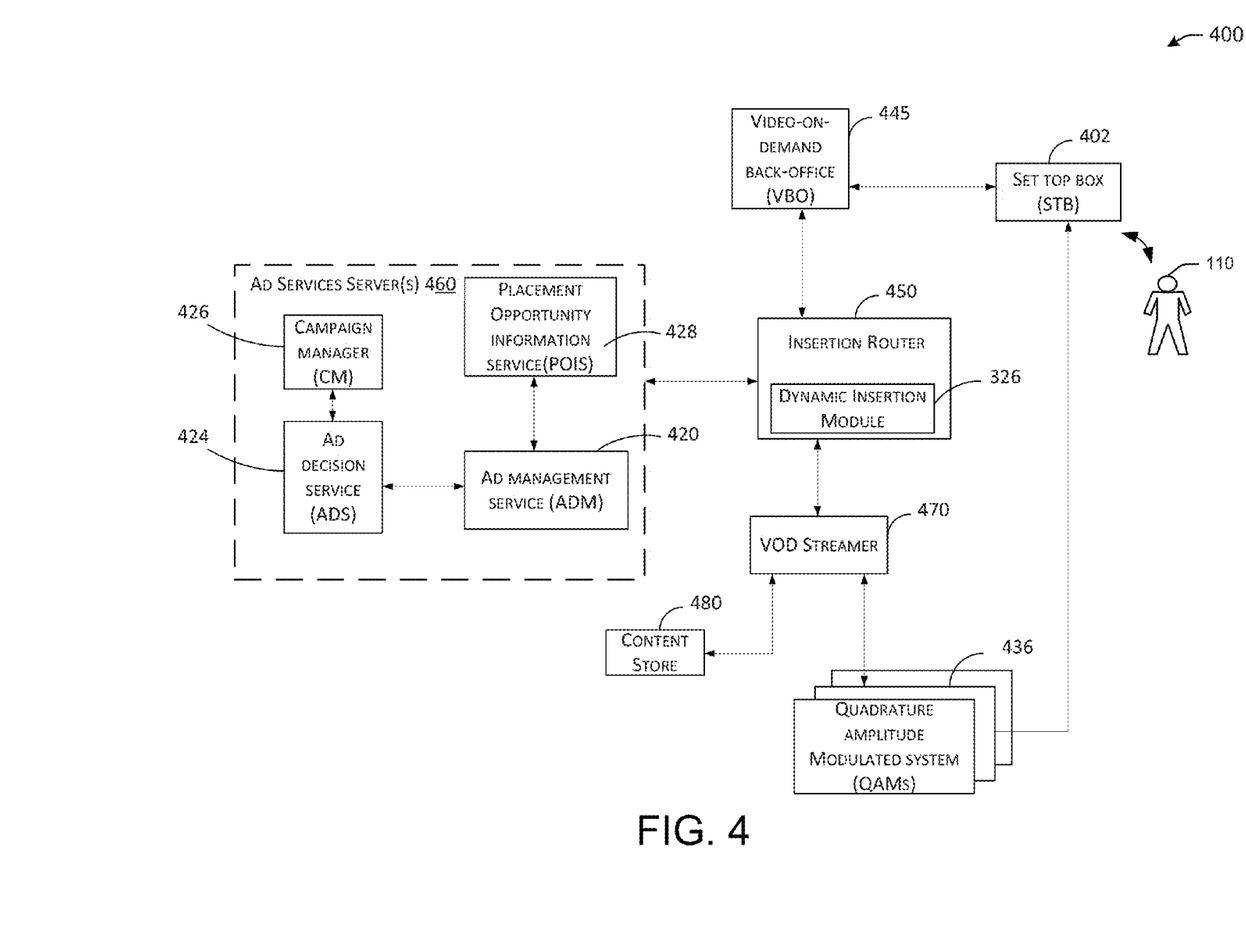
FIG. 4 is a simplified schematic diagram illustrating an exemplary implementation of a dynamic insertion network, in accordance with embodiments of the disclosure.

FIG. 4 is a schematic diagram illustrating an example architecture 400 for a dynamic insertion environment utilizing ads, in accordance with one or more embodiments of the disclosure. In the example embodiment, architecture 400 may include a user 110, user device (e.g., STB 402), a VBO 445, an insertion router 450, a VOD streamer 470, a content store 480, a quadrature amplitude modulated system (QAM) 436, and/or an ad services server(s) 460, which may be associated with an ad management service (ADM) 420, an ad decision service (ADS) 424, a campaign manager CM 426, and/or a placement opportunity information service (POIS) 428.

In some embodiments, the STB 402 may request content playback (e.g., requesting a video-on-demand movie) from the VBO 445. The session protocol that may be used to communicate between the STB 402 and the VBO 445 may be any session protocol such as session setup protocol (SSP) or real time streaming protocol (RTSP). It is understood that the SSP or RTSP are session protocols that may describe streaming media, which may be used for negotiation between endpoints of media type, format, and all associated properties, and that other session protocol may be used.

Before a media content playback may be presented to the user 110, the VBO 445 may perform authorization and authentication of the STB 402 to determine whether to allow the playback of the media requested (e.g., requesting a video-on-demand movie). Depending on the result of the authorization and/or authentication, the VBO 445 may communicate with a VOD streamer 470 to facilitate the streaming of the requested content. As explained above, in some embodiments, the insertion router 450 may be configured to intercept the stream setup message, which may be sent from the VBO 445 to the VOD streamer 470 to fulfill the STB 402 request for the media content playback (e.g., playing a video-on-demand movie).

In some embodiments, the dynamic insertion module(s) 326 of the insertion router 450 may be configured to cache and/or store the stream setup request message and may extract setup information (e.g., session objects) that may be found in the stream setup request message. Some examples of setup information that may be included in a stream setup message are the provider ID (e.g., NBC.com), asset ID, and the MAC address of the STB 402. Based on the session objects, the insertion router may communicate with the ad services server(s) 460 to request one or more secondary content playlists, for example, ad playlists that may be used to update the stream setup message before sending the stream setup message to the VOD streamer 470. The insertion router 450 may update the original stream setup message and/or may generate a second stream setup message that may include the ad playlist(s). For example, the insertion router 450 may request an ad playlist from the ADM 420. The ADM 420 may in turn request, for example, ad placement opportunities from the POIS 428 which may identify and provide descriptions of placement opportunities for media, such as the availability to insert ads and may identify policies used to coordinate the placements of, for example, ads within the requested media content (e.g., a movie) by the user device (e.g., STB 402). In some embodiments, the ADM 420 may receive the placement opportunities from the POIS 428. Based on the placement opportunities, the ADM 420 may send, for example, an ad placement request to the ADS 424 to get ad placement decisions. Accordingly, the ADM 420 may decide where to insert ads within the media content playlist. The ADS 424 may communicate with the CM 426 to determine available ad campaigns that may be associated with the session objects. For example, the session objects may infer that the STB 402 is associated with a teenager located in a particular city. The CM 426 may find that teenagers in a particular city may benefit from receiving ads related to an event, such as a concert. One or more ad playlists may be selected based on the ad campaigns. The CM 426 may update the ADS 424 with the available ads for this target audience (e.g., teenagers). The ADS 424 may create an ad playlist based on the ad campaigns determined by the CM 426. The ADS 424 may then send the ad playlist to the ADM 420. The ADM 420 may provide the ad playlist to the insertion router 450. It is understood that although ads are used as an example, other content, such as billing reminders, emergency announcements, etc. may be used.

In some embodiments, the insertion router 450 may update the original stream setup message with the ad playlist received from the ADM 420. It is understood that a playlist may be a list of references pointing to different content segments or items. For example, the ad playlist may be a list of items that may reference ads to be presented to the user device (e.g., STB 402). The insertion router 450 may update the stream setup message to include the ad playlist items. In another embodiment, the insertion router 450 may update the stream setup message or may generate a second stream setup message that may include the ad playlist. In some embodiments, the insertion router 450 may route the updated stream setup message (or the second stream setup message) to its intended destination, for example, the VOD streamer 470. The VOD streamer 470 may respond to the stream setup message (updated or second stream setup message) using a response message that may include the ad playlist or in the alternative, may not include the ad playlist.

In one embodiment, in case the VOD streamer 470 did not include the ad playlist in the response message, the insertion router 450 may receive or otherwise may intercept the response message coming from the VOD streamer 470. The insertion router 450 may update the response message with the ad playlist. The updated response message may include, among other things, the playlist duration as well as the playlist items. The updated response message may permit a client application to control actions taken on the user device 120, such as fast forwarding. For example, fast forwarding may be disabled across ads but allowed during the entertainment content. If a user presses a fast forward button on the entertainment segment, the user device 120 may adjust the progress bar to normal speed when the stream reaches the ad item.

The response message may provide parameters for setting up the media content streaming session with the STB 402. The insertion router 450 may receive the response message from the VOD streamer 470 and may forward it to the VBO 445. At that point, the stream session may be set up to start streaming the content requested by the user device (e.g., STB 402). The VBO 445 may provide the playlist to the STB 402 to start streaming the requested media content by the user device (e.g., STB 402).

The VOD streamer 470 may communicate with a content store 480 to get the ads and media content (e.g. video-on-demand movie). At that point, the VOD streamer 470 may stream the playlist to the RF channel (e.g., QAMs 436). Further, the STB 402 may tune to that RF channel to use that RF channel for downloading and/or consuming the requested content. At the end of the streaming session, the VOD streamer 470 may send the session history to the insertion router 450. The session history may include ad play-out events, such as ads presented to the user 110. The insertion router 450 may send the session history to the ADM 420.

Illustrative Processes

Figure 5:
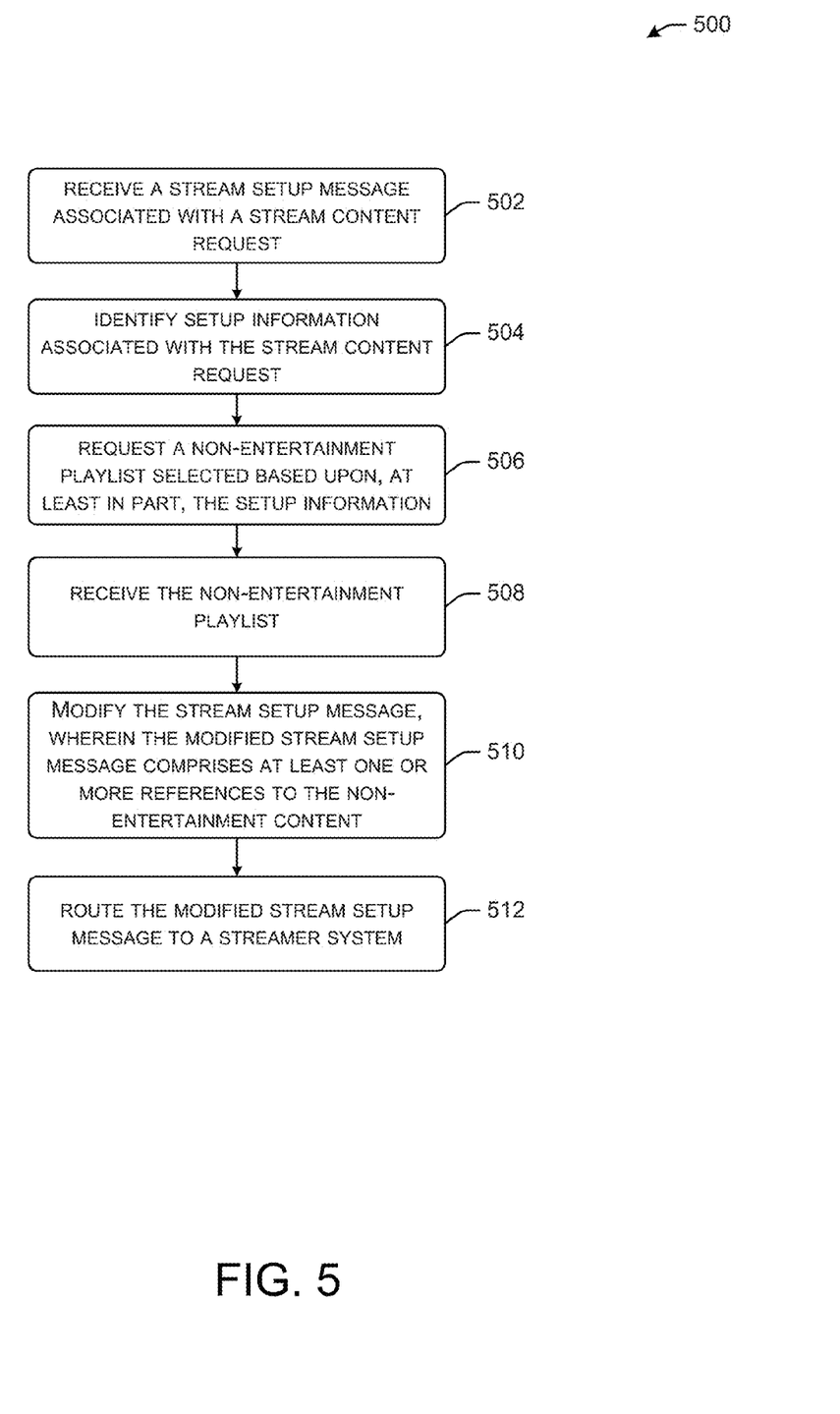
FIG. 5 is a flow diagram illustrating an example method for performing a dynamic insertion, in accordance with embodiments of the disclosure.

FIG. 5 is a process flow diagram of a method for dynamic insertion. In some embodiments, at block 502, the insertion router 450 may receive a stream setup message associated with a media content request. For example, the user device 120 may request a playback of a media content, such, video, audio, text, etc. In some embodiments, the user device 120 may be any of the devices mentioned above, for example, a set-top box which may request a session by communicating with the VBO 445. In some embodiments, the VBO 445 may receive a stream setup message from the user device 120 to set up the streaming session.

At block 504, the insertion router 450 may identify setup information associated with the media content request. For example, the insertion router 450 may examine the stream setup message to identify session objects that may be associated with the setup information, such as, a video-on-demand asset provider ID (PID), a provider asset ID (PAID), and/or an STB ID (e.g., MAC address) originating the request.

At block 506, the insertion router 450 may request a playlist for a second content (e.g., ad playlist) from the ADM 420. The ADM 420 may select the playlist for the second content (e.g., non-entertainment playlist) based on, at least in part, the setup information included in the stream setup message. The ADM 420 may communicate with the ADS 424, the POIS 428 and/or the CM 526 to determine the playlist for the second content associated with the setup information.

At block 508, the insertion router 450 may receive the playlist for the second content from the ADM 420.

At block 510, the insertion router 450 may modify the stream setup message or may update the original stream setup message. The modified stream setup message may contain references to the non-entertainment content. For example, the references may point to the ads that the user device 120 may consume. For example, the insertion router 450 as shown at block 508 may receive the non-entertainment playlist (e.g., ad playlist) from the ADM 420. The insertion router 450 may use the non-entertainment playlist to modify the stream setup message. The setup information found in the stream setup message may influence the choice of the non-entertainment playlist. Some example of setup information may be a video-on-demand asset provider ID (PID), a provider asset ID (PAID), and/or a set-top (STB) ID (e.g., MAC address) originating the request.

At block 512, the insertion router 450 may route the modified stream setup message to its intended destination. For example, the insertion router 450 may route the updated stream setup message to a streamer system such as, the VOD streamer 470, to allow the user device 120 to consume the ads selected by the ad services server 460 based on the setup information. Although the above examples are examples of inserting ads, other content inserting examples may be envisioned, such as inserting billing reminders, emergency announcements, or other non-entertainment content.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method comprising:
   receiving, by a router comprising one or more computer processors, a first stream setup message associated with a streaming request for a first content from a back office server associated with the first content;
   identifying, by the router, setup information associated with the streaming request for the first content, wherein the first content is associated with a first playlist, wherein the setup information includes information identifying a user associated with set-top box and at least one of a streaming asset provider identification and a set-top box identification;
   sending a request to a non-entertainment server, by the router, for a second playlist associated with a second content based at least in part on the setup information;
   receiving, by the router, in response to the request, the second playlist from the non-entertainment server;
   generating, by the router, a second stream setup message comprising a combined playlist based at least in part on the first playlist and the second playlist;
   routing, by the router, the second stream setup message to a streamer system to setup streaming of the first content based on the combined playlist;
   receiving, by the router, a first response message from the streamer system indicating the setup of the streaming of the first content based on the combined playlist;
   generating, by the router, in response to the first response message, a second response message that comprises at least in part the combined playlist; and
   routing, by the router, the second response message to the back office, wherein the back office provides the first content via the streamer system to a user device.

2. The method of claim 1, wherein the second playlist comprises one or more references to one or more non-entertainment content.

3. The method of claim 2, wherein the one or more non-entertainment content comprises at least one of an advertisement content, billing reminder content, announcement content, and emergency notification content.

4. The method of claim 1, wherein the first content comprises at least one of entertainment content, instructional content, and educational content.

5. The method of claim 1, further comprising, wherein the back office is a video on demand back office (VBO).

6. The method of claim 1, further comprising receiving, by the router, a session history including advertisement play-out events.

7. The method of claim 1, further comprising providing, by the router, a session history to an advertisement management service.

8. The method of claim 1, wherein the stream setup message includes the setup information.

9. A system comprising:
   at least one memory storing computer-executable instructions, and
   at least one communication interface; and
   at least one processor in communication with the at least one communications interface, and the at least one memory and configured to execute the computer-executable instructions to:
   receive a first stream setup message associated with a streaming request for a first content from a back office server associated with the first content;
   identify setup information associated with the streaming request for the first content, wherein the first content is associated with a first playlist, wherein the setup information includes information identifying a user associated with set-top box and at least one of a streaming asset provider identification and a set-top box identification;
   send a request to a non-entertainment server, for a second playlist associated with a second content based at least in part on the setup information;
   receive, in response to the request, the second playlist from the non-entertainment server;
   generate a second stream setup message comprising a combined playlist based at least in part on the first playlist and the second playlist;
   route the second stream setup message to a streamer system to setup streaming of the first content based on the combined playlist;
   receive a first response message from the streamer system indicating the setup of the streaming of the first content based on the combined playlist;

generate, in response to the first response message, a second response message that comprises at least in part the combined playlist; and route the second response message to the back office, wherein the back office provides the first content via the streamer system to a user device.

10. The system of claim 9, wherein the second playlist comprises one or more references to one or more non-entertainment content.

11. The system of claim 10, wherein the non-entertainment content comprises at least one of an advertisement content, billing reminder content, announcement content, and emergency notification content.

12. A non-transitory computer-readable medium storing computer-executable instructions which, when executed by a processor, cause the processor to perform operations comprising:

receiving a first stream setup message associated with a streaming request for a first content from a back office server associated with the first content;

identifying setup information associated with the streaming request for the first content, wherein the first content is associated with a first playlist, wherein the setup information includes information identifying a user associated with set-top box and at least one of a streaming asset provider identification and a set-top box identification;

sending a request to a non-entertainment server, for a second playlist associated with a second content based at least in part on the setup information;

receiving, in response to the request, the second playlist from the non-entertainment server;

generating a second stream setup message comprising a combined playlist based at least in part on the first playlist and the second playlist; and routing the second stream setup message to a streamer system to setup streaming of the first content based on the combined playlist;

receiving a first response message from the streamer system indicating the setup of the streaming of the first content based on the combined playlist; and generating, in response to the first response message, a second response message that comprises at least in part the combined playlist; and routing, the second response message to the back office, wherein the back office provides the first content via the streamer system to a user device.

13. The non-transitory computer-readable medium of claim 12, wherein the second playlist comprises one or more references to one or more non-entertainment content.

14. The non-transitory computer-readable medium of claim 13, wherein the non-entertainment content comprises at least one of an advertisement content, billing reminder content, announcement content, and emergency notification content.

15. The non-transitory computer-readable medium of claim 12, further comprising requesting the playlist for the second content based on, at least in part, the setup information.

16. The non-transitory computer-readable medium of claim 12, further comprising receiving a session history including advertisement play-out events.

* * * * *